United States Patent
Imai et al.

(10) Patent No.: US 12,015,843 B1
(45) Date of Patent: Jun. 18, 2024

(54) COMPUTER AND INFORMATION PROCESSING METHOD

(71) Applicant: Knowhere, Inc., Tokyo (JP)

(72) Inventors: Tatsuya Imai, Tokyo (JP); Hisashi Ito, Tokyo (JP)

(73) Assignee: KNOWHERE, INC., Tokyo (JP)

( * ) Notice: Subject to any disclaimer, the term of this patent is extended or adjusted under 35 U.S.C. 154(b) by 0 days.

(21) Appl. No.: 18/372,164

(22) Filed: Sep. 25, 2023

(30) Foreign Application Priority Data

Apr. 12, 2023 (JP) .................................. 2023-064860

(51) Int. Cl.
*G06T 7/60* (2017.01)
*G06T 7/73* (2017.01)
*H04N 23/661* (2023.01)

(52) U.S. Cl.
CPC ............. *H04N 23/661* (2023.01); *G06T 7/60* (2013.01); *G06T 7/73* (2017.01); *G06T 2207/20081* (2013.01); *G06T 2207/30224* (2013.01)

(58) Field of Classification Search
CPC ........... G06T 2207/30224; G06T 2207/30241; G06T 7/248; G06T 7/277; G06T 7/74; G06T 2207/10016; G06T 2207/30221; G06T 2207/30244; G06T 3/40; G06T 7/13; G06T 7/20; G06T 7/246; G06T 7/251; G06T 7/254; G06T 7/73; G06T 3/067; H04N 1/00251; H04N 21/23418; A63B 69/0071; A63B 2220/807; A63B 69/3658;

(Continued)

(56) References Cited

U.S. PATENT DOCUMENTS

| | | | | |
|---|---|---|---|---|
| 11,417,069 | B1 * | 8/2022 | Gupta | G06V 20/70 |
| 2006/0008116 | A1 * | 1/2006 | Kiraly | G06T 7/20 |
| | | | | 382/103 |
| 2018/0156914 | A1 * | 6/2018 | Tuxen | G01S 7/02 |
| 2021/0133482 | A1 * | 5/2021 | Kohler | G06T 7/536 |

(Continued)

FOREIGN PATENT DOCUMENTS

| | | |
|---|---|---|
| JP | 2005-529339 A | 9/2005 |
| JP | 2012-169844 A | 9/2012 |

(Continued)

OTHER PUBLICATIONS

Liu, "Lifting 2D object detection to 3D in autonomous driving", https://towardsdatascience.com/geometric-reasoning-based-cuboid-generation-in-monocular-3d-object-detection-5ee2996270d1 Nov. 3, 2019 (Year: 2019).*

(Continued)

*Primary Examiner* — Ian L Lemieux
(74) *Attorney, Agent, or Firm* — XSENSUS LLP (57) ABSTRACT

A reception unit 26a receives a still image of a spherical object captured by a camera 52 and information on the angle of view or the focal length of the camera 52 having captured the object, transmitted from a terminal (e.g., mobile communication terminal 50) including the camera 52. A calculation unit 28a calculates coordinates of four corners of a rectangle 210 enclosing the object from the still image of the object received by the reception unit 26a, and calculates direction vectors extending toward the object from the focal point of the lens of the camera 52, from the calculated coordinates of the four corners of the rectangle 210 enclosing the object and the angle of view or the focal length of the camera 52. An estimation unit 30a estimates three-dimensional coordinates of the center of the object, based on the direction vectors calculated by the calculation unit 28a.

6 Claims, 6 Drawing Sheets

(58) Field of Classification Search
CPC ......... G01B 5/0023; G01P 3/68; G01P 3/685; G01P 3/38

See application file for complete search history.

(56) References Cited

U.S. PATENT DOCUMENTS

| | | | | |
|---|---|---|---|---|
| 2023/0065922 A1* | 3/2023 | Okur | .................... | G06V 20/52 |
| 2023/0188855 A1* | 6/2023 | Kikuchi | ................ | H04N 23/90 |
| | | | | 348/262 |
| 2023/0405432 A1* | 12/2023 | Chang | ................ | A63B 69/3661 |
| 2024/0005547 A1* | 1/2024 | Lin | ............................ | G06T 7/70 |

FOREIGN PATENT DOCUMENTS

| | | | |
|---|---|---|---|
| JP | 2016-540185 A | | 12/2016 |
| JP | 6236600 B1 | | 11/2017 |
| JP | 2019-219373 A | | 12/2019 |
| JP | 6763559 B1 | | 9/2020 |
| JP | 2021-068356 A | | 4/2021 |
| JP | 2021-071387 A | | 5/2021 |
| KR | 102519798 B1 | * | 4/2023 |
| WO | 2021/064912 A1 | | 4/2021 |
| WO | 2022/137450 A1 | | 6/2022 |

OTHER PUBLICATIONS

Mousavian et al., "3D Bounding Box Estimation Using Deep Learning and Geometry", arXiv:1612.00496v2 [cs.CV] Apr. 10, 2017 (Year: 2017).*

Fang et al., "3D Bounding Box Estimation for Autonomous Vehicles by Cascaded Geometric Constraints and Depurated 2D Detections Using 3D Results", arXiv:1909.01867 [cs.CV] Sep. 1, 2019 (Year: 2019).*

Yang et al., "Cubeslam: Monocular 3-d object slam" IEEE Transactions on Robotics 35.4 (2019) 925-938 (Year: 2019).*

Liu et al. "Deep Fitting Degree Scoring Network for Monocular 3D Object Detection", arXiv:1904.12681 [cs.CV], Jun. 8, 2019 (Year: 2019).*

Notice of Reasons for Refusal mailed on Apr. 28, 2023, received for JP Application 2023-064860, 10 pages including English Translation.

Notice of Reasons for Refusal mailed on Jun. 2, 2023, received for JP Application 2023-064860, 10 pages including English Translation.

Decision to Grant mailed on Jul. 7, 2023, received for JP Application 2023-064860, 5 pages including English Translation.

* cited by examiner

COMPUTER AND INFORMATION PROCESSING METHOD

CROSS-REFERENCE TO RELATED APPLICATION

This application claims priority from Japanese Patent Application No. 2023-064860, filed on Apr. 12, 2023. The entire teachings of the above application are incorporated herein by reference.

TECHNICAL FIELD

The present disclosure relates to a computer and an information processing method.

BACKGROUND ART

For ball games using balls, such as baseball, soccer, golf, and basketball, various technologies for tracking the trajectory of a ball are known. For example, JP6236600B, JP6763559B, JP2016-540185A, JP2019-219373A, and JP2005-529339A disclose technologies of estimating the position or the speed of a spherical object moving in a three-dimensional space, using a high-speed camera capable of high-speed continuous shooting in a short time.

SUMMARY OF THE INVENTION

In a conventional system for tracking the trajectory of a ball, a dedicated camera for capturing a ball is used, and with the position of the camera fixed, the ball is captured in a state in which the zoom magnification and the focus position of the camera are fixed. However, in the conventional system, a dedicated position-fixed camera is needed, resulting in high introduction cost. Meanwhile, if the zoom magnification or the focus position of the camera can be changed between one movement of the ball and another, convenience can be enhanced.

Considering the above circumstances, an object of the present disclosure is to provide a computer, an information processing method and a model generation method that can accurately estimate three-dimensional coordinates of a spherical object without using a dedicated position-fixed camera.

A computer of the present disclosure includes: a processor; and a storage unit. Through execution of a program stored in the storage unit, the processor is configured to cause a reception unit to receive a still image of a predetermined-size spherical object captured by a camera and information on an angle of view or a focal length of the camera having captured the object, which are transmitted from a terminal including the camera, cause a calculation unit to calculate coordinates of four corners of a rectangle enclosing the object from the still image of the object received by the reception unit, and calculate direction vectors extending from a focal point of a lens of the camera toward the coordinates of the four corners of the rectangle enclosing the object, from the calculated coordinates of the four corners of the rectangle enclosing the object and the angle of view or the focal length of the camera, cause an estimation unit to estimate three-dimensional coordinates of a center of the object, based on the direction vectors calculated by the calculation unit, and cause an output unit to output the three-dimensional coordinates of the center of the object estimated by the estimation unit.

In the computer of the present disclosure, in causing the estimation unit to estimate the three-dimensional coordinates of the center of the object, the three-dimensional coordinates of the center of the object may be estimated based on the direction vectors calculated by the calculation unit, using a first estimation model obtained through machine learning using training data including the direction vectors extending toward the object from the focal point of the lens of the camera having captured the object and the three-dimensional coordinates of the center of the object.

In the computer of the present disclosure, through execution of the program stored in the storage unit, the processor may be configured to, using the training data including the direction vectors extending toward the spherical object from the focal point of the lens of the camera having captured the object and the three-dimensional coordinates of the center of the object, generate, through machine learning, the first estimation model for estimating the three-dimensional coordinates of the center of the object from the direction vectors extending toward the object from the focal point of the lens of the camera.

A computer of the present disclosure includes: a processor; and a storage unit. Through execution of a program stored in the storage unit, the processor is configured to cause a reception unit to receive a still image of a spherical object captured by a camera and information on an angle of view or a focal length of the camera having captured the object, which are transmitted from a terminal including the camera, cause a calculation unit to calculate coordinates of four corners of a rectangle enclosing the object from the still image of the object received by the reception unit, cause an estimation unit to estimate three-dimensional coordinates of a center of the object, based on the coordinates of the four corners of the rectangle calculated by the calculation unit and the angle of view or the focal length of the camera, without calculating direction vectors extending from a focal point of a lens of the camera toward the four corners of the rectangle enclosing the object, and cause an output unit to output the three-dimensional coordinates of the center of the object estimated by the estimation unit. Further, in causing the estimation unit to estimate the three-dimensional coordinates of the center of the object, the three-dimensional coordinates of the center of the object are estimated based on the coordinates of the four corners of the rectangle calculated by the calculation unit and the angle of view or the focal length of the camera, using a second estimation model obtained through machine learning using training data including the coordinates of the four corners of the rectangle enclosing the object acquired from the still image of the spherical object, the angle of view or the focal length of the camera having captured the object, and the three-dimensional coordinates of the center of the object.

In the computer of the present disclosure, through execution of the program stored in the storage unit, the processor may be configured to, using the training data including the coordinates of the four corners of the rectangle enclosing the object acquired from the still image of the spherical object, the angle of view or the focal length of the camera having captured the object, and the three-dimensional coordinates of the center of the object, generate, through machine learning, the second estimation model for estimating the three-dimensional coordinates of the center of the object from the coordinates of the four corners of the rectangle enclosing the object and the angle of view or the focal length of the camera having captured the object.

In the computer of the present disclosure, on the terminal, the angle of view or the focal length of the camera may be allowed to be adjusted before the object is captured by the camera, and when the object is captured by the camera, the still image of the captured object and information on the adjusted angle of view or focal length of the camera may be transmitted from the terminal to the computer.

In the computer of the present disclosure, the terminal may allow a capturing application to be installed thereon, and in a state in which the capturing application is started on the terminal, when the object is captured by the camera, the still image of the captured object and information on the angle of view or the focal length of the camera when the object is captured may be transmitted from the terminal to the computer by the capturing application.

In the computer of the present disclosure, on a browser displayed on a monitor of the terminal, information on the angle of view or the focal length of the camera may be allowed to be inputted before the object is captured by the camera, and when the object is captured by the camera, the still image of the captured object and information on the angle of view or the focal length of the camera inputted on the browser may be transmitted from the terminal to the computer.

An information processing method of the present disclosure is an information processing method performed by a computer including a control unit, the method including the steps of: the control unit receiving a still image of a predetermined-size spherical object captured by a camera and information on an angle of view or a focal length of the camera having captured the object, which are transmitted from a terminal including the camera; the control unit calculating coordinates of four corners of a rectangle enclosing the object from the received still image of the object, and calculating direction vectors extending from a focal point of a lens of the camera toward the coordinates of the four corners of the rectangle enclosing the object, from the calculated coordinates of the four corners of the rectangle enclosing the object and the angle of view or the focal length of the camera; the control unit estimating three-dimensional coordinates of a center of the object, based on the calculated direction vectors; and the control unit outputting the estimated three-dimensional coordinates of the center of the object.

An information processing method of the present disclosure is an information processing method performed by a computer including a control unit, the method comprising the steps of: the control unit receiving a still image of a spherical object captured by a camera and information on an angle of view or a focal length of the camera having captured the object, which are transmitted from a terminal including the camera; the control unit calculating coordinates of four corners of a rectangle enclosing the object from the received still image of the object; the control unit estimating three-dimensional coordinates of a center of the object, based on the calculated coordinates of the four corners of the rectangle and the angle of view or the focal length of the camera, without calculating direction vectors extending from a focal point of a lens of the camera toward the four corners of the rectangle enclosing the object; and the control unit outputting the estimated three-dimensional coordinates of the center of the object.

In a model generation method of the present disclosure, using training data including direction vectors extending from a focal point of a lens of a camera having captured a predetermined-size spherical object toward coordinates of four corners of a rectangle enclosing the object and three-dimensional coordinates of a center of the object, a first estimation model for estimating the three-dimensional coordinates of the center of the object from the direction vectors extending from the focal point of the lens of the camera toward the four corners of the rectangle enclosing the object is generated through machine learning.

In a model generation method of the present disclosure, using training data including coordinates of four corners of a rectangle enclosing a predetermined-size spherical object acquired from a still image of the object, an angle of view or a focal length of a camera having captured the object, and three-dimensional coordinates of a center of the object, a second estimation model for estimating the three-dimensional coordinates of the center of the object from the coordinates of the four corners of the rectangle enclosing the object and the angle of view or the focal length of the camera having captured the object is generated through machine learning.

DETAILED DESCRIPTION

Hereinafter, an embodiment of the present disclosure will be described with reference to the drawings. FIG. 1 to FIG. 6 show a computer 10, an information processing method, and the like according to the present embodiment. The computer 10 according to the present embodiment estimates three-dimensional coordinates of the center of a predetermined-size spherical object (specifically, ball 200), without using a dedicated position-fixed camera.

Figure 1:
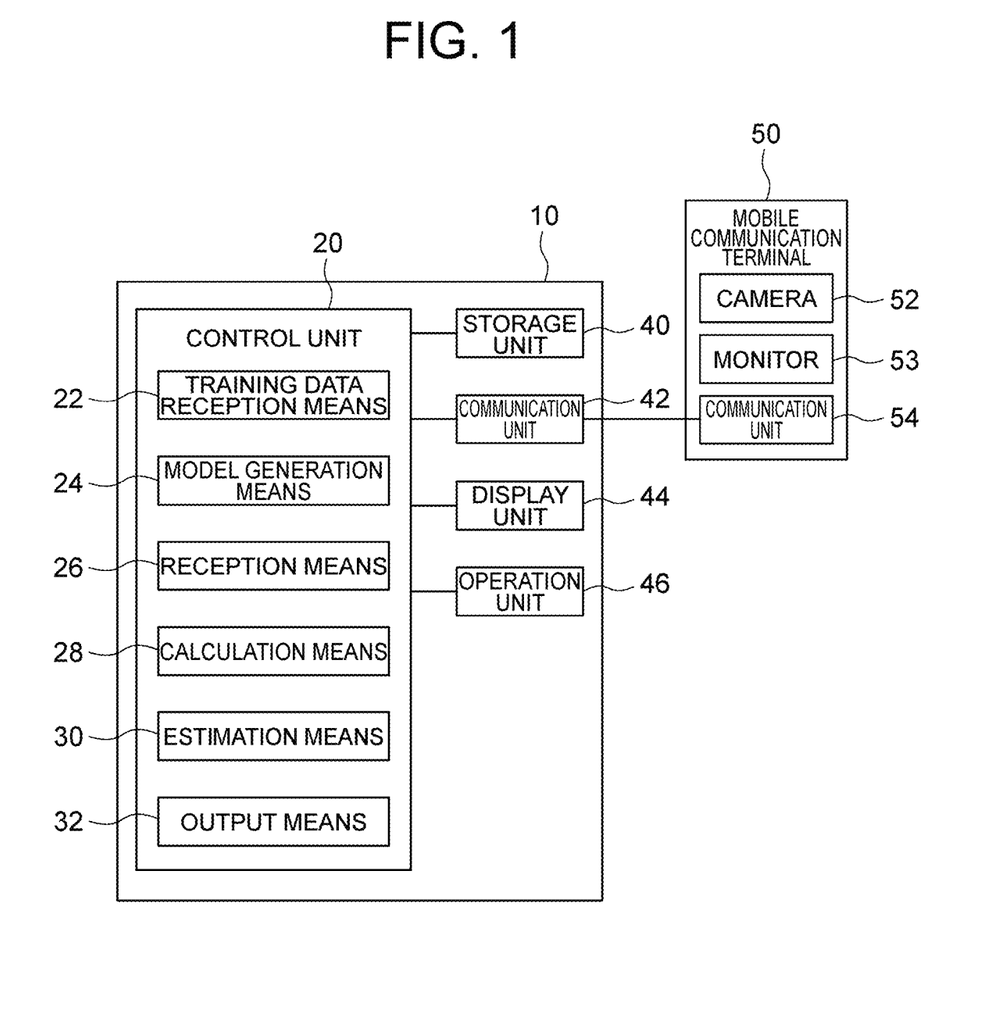
FIG. 1 is a schematic configuration diagram schematically showing a configuration of a computer according to an embodiment of the present disclosure.

First, a configuration of the computer 10 of the present embodiment will be described with reference to FIG. 1. FIG. 1 is a schematic configuration diagram schematically showing the configuration of the computer 10 according to the present embodiment. As shown in FIG. 1, the computer 10 of the present embodiment is formed of a computer and the like, and includes a control unit 20, a storage unit 40, a communication unit 42, a display unit 44, and an operation unit 46.

The control unit 20 is formed of a central processing unit (CPU), a graphics processing unit (GPU), and the like, and controls operation of the computer 10. Specifically, the control unit 20 executes a program stored in a storage unit 40 described later, to function as training data reception means 22, model generation means 24, reception means 26, calculation means 28, estimation means 30, and output means 32.

The training data reception means 22 receives training data 100 including direction vectors extending toward the ball 200 (object) from a focal point of a lens of a camera 52 of a mobile communication terminal 50 having captured the object, and three-dimensional coordinates of the center of the object. Alternatively, the training data reception means 22 may receive training data 100 including the coordinates of four corners of a rectangle 210 (see FIG. 4; including square) as a bounding box enclosing the ball 200 in a still image, the angle of view of the camera 52 of the mobile communication terminal 50 having captured the ball 200, and the three-dimensional coordinates of the center of the ball 200.

Using the training data 100 including the direction vectors extending toward the object from the focal point of the lens of the camera 52 of the mobile communication terminal 50 having captured the ball 200, and the three-dimensional coordinates of the center of the object, the model generation means 24 generates, through machine learning, an estimation model 110 (first estimation model) for estimating the three-dimensional coordinates of the center of the object from the direction vectors extending toward the object from the focal point of the lens of the camera 52. Alternatively, using the training data 100 including the coordinates of the four corners of the rectangle 210 enclosing the ball 200 acquired from the still image of the ball 200, the angle of view or the focal length of the camera 52 having captured the ball 200, and the three-dimensional coordinates of the center of the ball 200, the model generation means 24 may generate, through machine learning, an estimation model 110 (second estimation model) for estimating the three-dimensional coordinates of the center of the ball 200 from the coordinates of the four corners of the rectangle 210 enclosing the ball 200 and the angle of view or the focal length of the camera 52 having captured the ball 200. As the machine learning, various known methods such as deep learning may be used.

The reception means 26 receives a still image 120 of the ball 200 and information on the angle of view or the focal length of the camera 52 having captured the ball 200, which are transmitted from the mobile communication terminal 50. The angle of view or the focal length of the camera 52 that the reception means 26 receives differs depending on the zoom magnification or resolution setting of the camera 52.

The calculation means 28 calculates the coordinates of the four corners of the rectangle 210 enclosing the ball 200, from the still image 120 of the ball 200. Further, the calculation means 28 calculates the direction vectors extending from the focal point of the lens of the camera 52 toward the object, from the coordinates of the four corners of the rectangle 210 enclosing the ball 200 and the angle of view or the focal length of the camera 52.

The estimation means 30 estimates the three-dimensional coordinates of the center of the ball 200, based on the coordinates of the four corners of the rectangle 210 calculated by the calculation means 28 and the angle of view or the focal length of the camera 52, or based on the direction vectors calculated by the calculation means 28. At this time, the estimation means 30 may estimate the three-dimensional coordinates of the center of the ball 200, based on the direction vectors calculated by the calculation means 28, using the estimation model 110 (first estimation model) obtained through machine learning using the training data 100 including the direction vectors extending toward the object from the focal point of the lens of the camera 52 having captured the ball 200 and the three-dimensional coordinates of the center of the ball 200. Alternatively, the estimation means 30 may estimate the three-dimensional coordinates of the center of the ball 200, based on the coordinates of the four corners of the rectangle 210 calculated by the calculation means 28 and the angle of view or the focal length of the camera 52, using the estimation model 110 (second estimation model) obtained through machine learning using the training data 100 including the coordinates of the four corners of the rectangle 210 enclosing the ball 200 acquired from the still image of the ball 200, the angle of view or the focal length of the camera 52 having captured the ball 200, and the three-dimensional coordinates of the center of the ball 200.

The output means 32 outputs the three-dimensional coordinates of the center of the ball 200 estimated by the estimation means 30. The three-dimensional coordinates of the center of the ball 200 outputted from the output means 32 are transmitted from the computer 10 to the mobile communication terminal 50, and then displayed on a monitor 53 of the mobile communication terminal 50.

The details of the functions of the means 22, 24, 26, 28, 30, 32 will be described later.

The storage unit 40 is formed of, for example, a hard disk drive (HDD), a random access memory (RAM), a read only memory (ROM), a solid state drive (SSD), and the like. The storage unit 40 is not limited to a type provided in the computer 10, and may be a storage medium (e.g., USB memory) that can be detachably mounted to the computer 10, or the like. In the present embodiment, the storage unit 40 stores the program to be executed by the control unit 20, the estimation model 110, and the like.

The communication unit 42 includes a communication interface for transmitting/receiving a signal to/from an external device wirelessly or via a wire. The communication unit 42 allows the control unit 20 to perform transmission/reception of a signal to/from the mobile communication terminal 50 described later.

The display unit 44 is, for example, a monitor or the like, and displays various screens by receiving a display command signal from the control unit 20. The operation unit 46 is, for example, a keyboard or the like, and can give various commands to the control unit 20. In the present embodiment, a display operation unit such as a touch panel having the display unit 44 and the operation unit 46 integrally may be used.

Figure 6:
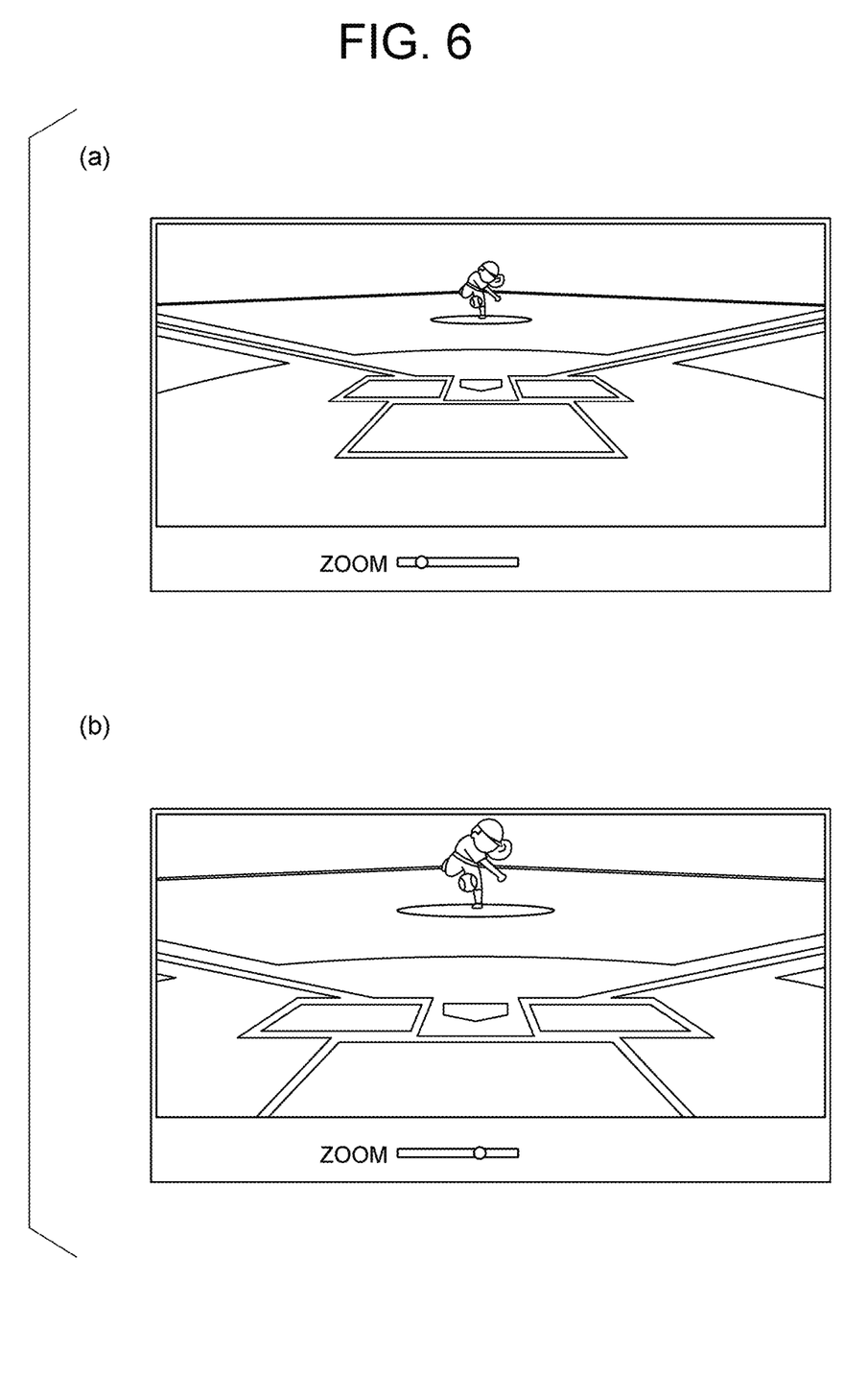
FIG. 6 shows images displayed on a monitor of a mobile communication terminal before and after the zoom magnification of the camera is adjusted.

Next, the configuration of the mobile communication terminal 50 for capturing the ball 200 will be described with reference to FIG. 1. As shown in FIG. 1, the mobile communication terminal 50 includes the camera 52, the monitor 53, and the communication unit 54. The camera 52 captures moving images of the ball 200. The still image 120 at each frame of the ball 200 is acquired from the moving images of the ball 200 captured by the camera 52. On the monitor 53, the still image 120 or the moving images of the ball 200 captured by the camera 52 are displayed. Here, as shown in FIG. 6, when the focus of the camera 52 is adjusted, the screen displayed on the monitor 53 also changes. The communication unit 54 includes the communication interface for transmitting/receiving a signal to/from an external device wirelessly or via a wire. The still image 120 at each frame of the ball 200 captured by the camera 52 is transmitted to the computer 10 by the communication unit 54. As the mobile communication terminal 50, a smartphone, a tablet computer, or the like may be used, for example. As the mobile communication terminal 50, a video camera or the like capable of communicating with an external device may be used.

In the present embodiment, a capturing application can be installed on the mobile communication terminal 50. When the capturing application installed on the mobile communication terminal 50 is started, the capturing application allows the camera 52 to capture the ball 200. When the ball 200 is captured by the camera 52, a still image of the captured ball 200 and information on the angle of view or the focal length of the camera 52 when the ball 200 is captured, are transmitted from the mobile communication terminal 50 to the computer 10 by the capturing application.

In capturing the ball 200 by the camera 52, information on the angle of view or the focal length of the camera 52 may be allowed to be inputted on a browser displayed on the monitor 53 of the mobile communication terminal 50. When the ball 200 is captured by the camera 52, a still image of the captured ball 200 and information on the angle of view or the focal length of the camera 52 inputted on the browser are transmitted from the mobile communication terminal 50 to the computer 10.

Figure 2:
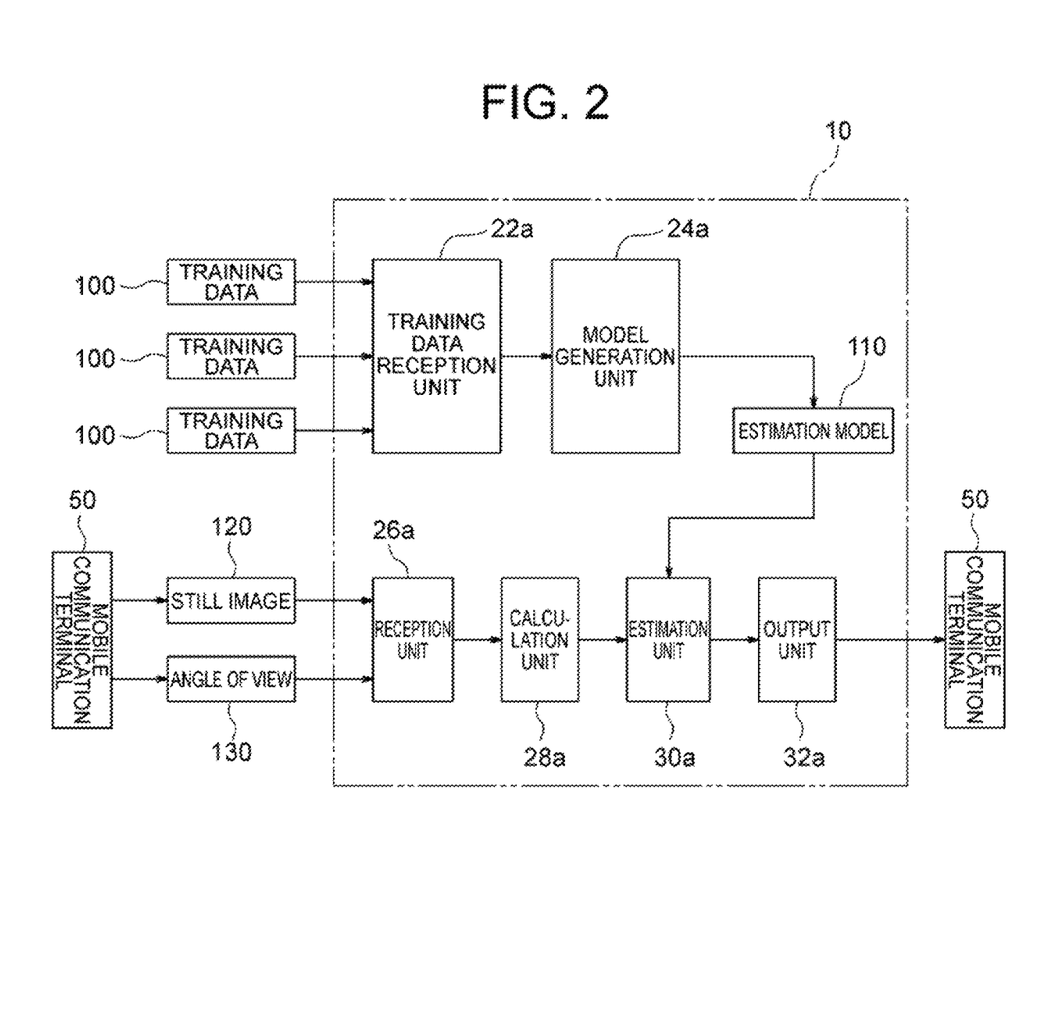
FIG. 2 shows a flow of an information process performed by a control unit executing a program on the computer shown in FIG. 1.

As shown in FIG. 2, in the present embodiment, the control unit 20 executes the program stored in the storage unit 40, to function as the training data reception means 22, thus configuring a training data reception unit 22a. The control unit 20 executes the program stored in the storage unit 40, to function as the model generation means 24, thus configuring a model generation unit 24a. The control unit 20 executes the program stored in the storage unit 40, to function as the reception means 26, thus configuring a reception unit 26a. The control unit 20 executes the program stored in the storage unit 40, to function as the calculation means 28, thus configuring a calculation unit 28a. The control unit 20 executes the program stored in the storage unit 40, to function as the estimation means 30, thus configuring an estimation unit 30a. The control unit 20 executes the program stored in the storage unit 40, to function as the output means 32, thus configuring an output unit 32a.

Figure 4:
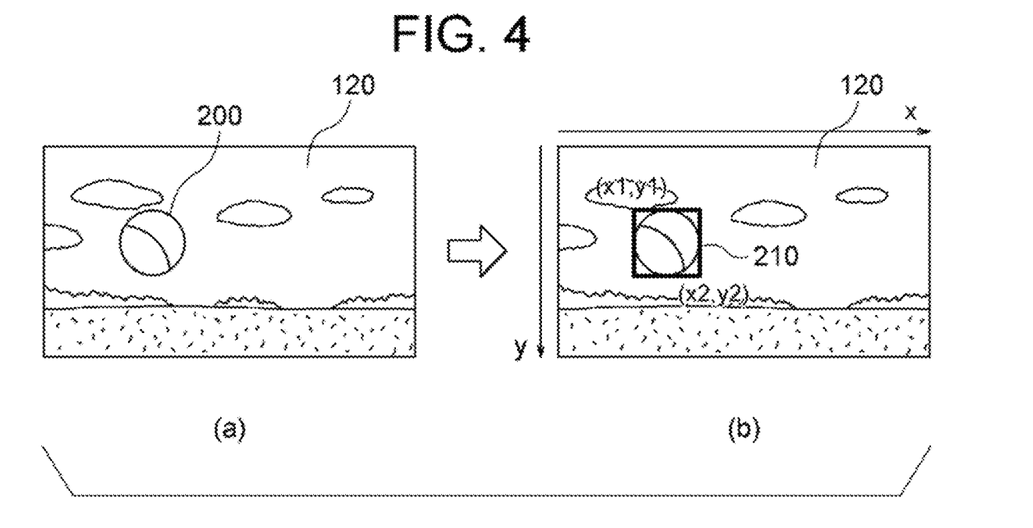
FIG. 4 illustrates a method for forming a bounding box enclosing a ball in a still image including the ball.

Next, a method for the calculation means 28 (calculation unit 28a) to calculate the coordinates of the four corners of the rectangle 210 as the bounding box enclosing the ball 200 from the still image 120 of the ball 200, will be described with reference to FIG. 4. FIG. 4(*a*) shows the still image 120 including the ball 200. By the control unit 20 executing the program stored in the storage unit 40, the calculation means 28 generates the rectangle 210 enclosing the ball 200 in the still image 120 as shown in FIG. 4(*b*). Here, y coordinates of an upper side and a lower side of the rectangle 210 are a y coordinate (y1) of a pixel at which the y coordinate is smallest of all pixels representing the color of the ball 200, and a y coordinate (y2) of a pixel at which the y coordinate is greatest, respectively. In addition, x coordinates of a left side and a right side of the rectangle 210 are an x coordinate (x1) of a pixel at which the x coordinate is smallest of all the pixels representing the color of the ball 200, and an x coordinate (x2) of a pixel at which the x coordinate is the greatest, respectively. Then, the coordinates of the four corners of the rectangle 210 are represented by (x1, y1), (x1, y2), (x2, y2), and (x2, y1).

In the present embodiment, the calculation means 28 may calculate the coordinates of the four corners of the rectangle 210 enclosing the ball 200, from the still image 120 of the ball 200, using AI for detecting an object appearing in an image. Specifically, using training data including the still image 120 of the ball 200 and the coordinates of the four corners of the rectangle 210 enclosing the ball 200, an estimation model which receives the still image 120 of the ball 200 and outputs the coordinates of the four corners of the rectangle 210 enclosing the ball 200, is generated through machine learning. As the machine learning, various known methods such as deep learning may be used. Then, the calculation means 28 calculates the coordinates of the four corners of the rectangle 210 enclosing the ball 200 from the still image 120 of the ball 200, using the generated estimation model.

Figure 5:
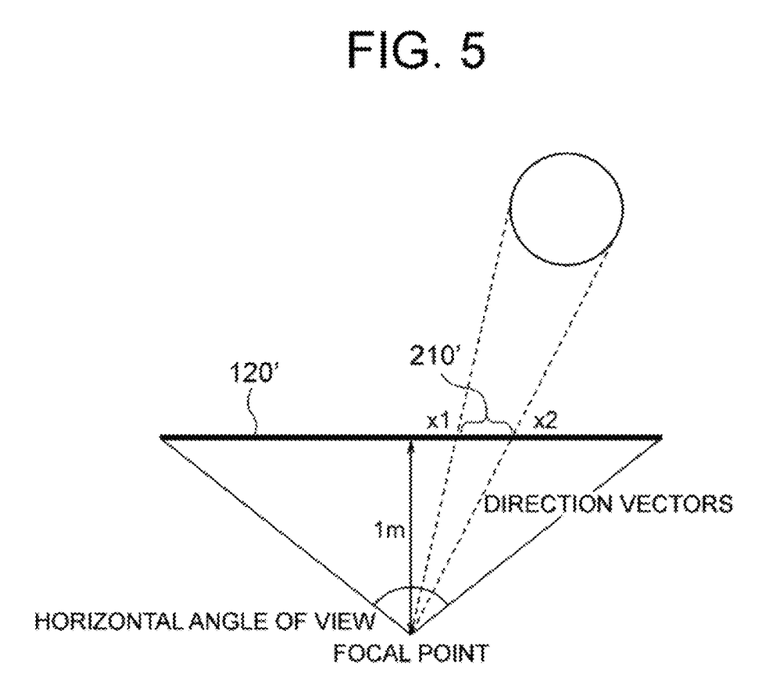
FIG. 5 illustrates a method for calculating direction vectors extending from a focal point of a lens of a camera toward the ball, from coordinates of four corners of the bounding box enclosing the ball.

Next, a method for the calculation means 28 (calculation unit 28a) to calculate the direction vectors extending from the focal point of the lens of the camera 52 toward the ball 200 (specifically, direction vectors extending toward the coordinates of the four corners around the object, for example), from the coordinates of the four corners of the rectangle 210 enclosing the ball 200 and the angle of view (indicated by 130 in FIG. 5) of the camera 52 will be described with reference to FIG. 5. FIG. 5 is a view of the still image 120 shown in FIG. 4, as seen directly from above. A segment representing the still image 120 shown in FIG. 4 as seen from above is indicated by 120' in FIG. 5. In FIG. 5, for explanation, regarding the three-dimensional coordinates of the center of the ball 200, the focal point of the lens of the camera 52 is defined as an origin, the right direction is defined as positive in the x coordinate, the depth direction of the drawing sheet is defined as positive in the y coordinate, and the upward direction is defined as positive in the z coordinate. Each direction vector is scaled with z=1 m. That is, the z coordinate of the direction vector in the three-dimensional coordinate system is set at 1 (unit: m). The x coordinates of all points on the left side of the rectangle 210 shown in FIG. 4 are x1, and the x coordinates of all points on the right side are x2. Therefore, the rectangle 210 shown in FIG. 4 is present between the coordinate x1 and the coordinate x2 in FIG. 5. A segment representing the rectangle 210 shown in FIG. 4 as seen from above is indicated by 210' in FIG. 5.

In the case where the direction vector is scaled with z=1 m, i.e., the z coordinate of the direction vector in the three-dimensional coordinate system is set at 1 (unit: m), if the horizontal width (number of pixels) of the image is w, the x coordinate of a direction vector extending toward the right side of the rectangle 210, in the three-dimensional coordinate system, is ((x2/w−0.5)×2×tan(horizontal angle of view/2)) (unit: m). Similarly, the x coordinate of a direction vector extending toward the left side of the rectangle 210, in the three-dimensional coordinate system, is ((x1/w−0.5)×2×tan(horizontal angle of view/2)) (unit: m). This is because the x coordinates at the left and right ends of the still image 120 distant by 1 m from the focal point of the lens of the camera 52 are (+tan(angle of view/2)) (unit: m). The horizontal angle of view refers to an angle of view of the camera 52 in the horizontal direction. Similarly, when the field of view of the camera 52 is seen directly from the side, the y coordinate of a direction vector extending toward the upper side of the rectangle 210, in the three-dimensional coordinate system, and the y coordinate of a direction vector extending toward the lower side of the rectangle 210, in the three-dimensional coordinate, can also be calculated. Specifically, in the case where the z coordinate of the direction vector in the three-dimensional coordinate system is set at 1 (unit: m), if the height (number of pixels) of the image is h, the y coordinate of a direction vector extending toward the upper side of the rectangle 210, in the three-dimensional coordinate system, is ((y1/h−0.5)×2×tan(vertical angle of view/2)) (unit: m). Similarly, the x coordinate of a direction vector extending toward the lower side of the rectangle 210, in the three-dimensional coordinate system, is ((y2/h−0.5)×2×tan(vertical angle of view/2)) (unit: m). The vertical angle of view refers to an angle of view of the camera 52 in the vertical direction.

The total number of components of the direction vectors to the four corners of the rectangle 210 is three components in the x direction, y direction, and the z direction×4 (coordinate sets of four corners)=12. However, the direction vectors are scaled with z=1 (unit: m), and the component values are the same between the x components of the upper left and lower left vectors, between the x components of the upper right and lower right vectors, between the y components of the upper left and upper right vectors, and between the y components of the lower left and lower right vectors. Therefore, elements of the direction vectors extending from the focal point of the lens of the camera 52 toward the ball 200 as the training data 100 are sufficient with the following four data.

(a) (x1/w−0.5)×2×tan(horizontal angle of view/2)
(b) (x2/w−0.5)×2×tan(horizontal angle of view/2)
(c) (y1/h−0.5)×2×tan(vertical angle of view/2)
(d) (y2/h−0.5)×2×tan(vertical angle of view/2)

For example, using linear regression, as preparing the coefficients Ca, Cb, Cc, Cd, and B for (a), (b), (c), and (d) above, the z coordinate of the center of the object can be estimated from only the direction vectors by formulating the equation $$z=Ca\times(a)+Cb\times(b)+Cc\times(c)+Cd\times(d)+B$$

In addition to linear regression, more complex machine learning models can be used. The x,y coordinates of the center of the object can be estimated directly from the direction vectors as well as the z coordinate by linear regression or by another method such as inputting the estimated z coordinate. In linear regression, the coefficients Ca, Cb, Cc, Cd, and B can be estimated a priori from z and (a) (b) (c) (d) data. Such technical matters are very common for those skilled in the art. However, even if the center of a sphere has the same coordinates, the values of (a) (b) (c) (d) will be different for a baseball and a basketball, for example. In contrast, by determining the size of the spherical object, the appropriate values of the coefficients Ca, Cb, Cc, Cd, and B in the linear regression can be determined, and the 3D coordinates of the center of the object can be accurately estimated from the calculated direction vector based on the size of the spherical object.

By a known method, the direction vectors extending from the focal point of the lens of the camera 52 toward the ball 200 may be calculated from the coordinates of the four corners of the rectangle 210 enclosing the ball 200, and the focal length of the camera 52 instead of the angle of view of the camera 52. Here, the focal length of the camera 52 refers to a distance from the center point of the lens to an image sensor (film plane).

Next, operation by the computer 10 as described above will be described.

First, a generation method for the estimation model 110 will be described. The training data 100 including the direction vectors extending toward the object from the focal point of the lens of the camera 52 of the mobile communication terminal 50 having captured the ball 200 and the three-dimensional coordinates of the center of the ball 200, is inputted to the control unit 20 of the computer 10. The training data 100 as described above may be inputted by the operation unit 46, or may be transmitted from an external device to the control unit 20 via the communication unit 42. When the training data 100 is inputted to the control unit 20 of the computer 10, the training data reception means 22 receives the training data 100. Then, the model generation means 24 performs machine learning using the training data 100, to generate the estimation model 110 (first estimation model) for estimating the three-dimensional coordinates of the center of the ball 200 from the direction vectors extending toward the object from the focal point of the lens of the camera 52 of the mobile communication terminal 50 having captured the ball 200 and the angle of view or the focal length of the camera 52 having captured the ball 200.

The generation method for the estimation model 110 is not limited to the above one. Another method will be described below. The training data 100 including the coordinates of the four corners of the rectangle 210 enclosing the ball 200 acquired from a still image of the ball 200, the angle of view or the focal length of the camera 52 having captured the ball 200, and the three-dimensional coordinates of the center of the ball 200, is inputted to the control unit 20 of the computer 10. The training data 100 as described above may be inputted by the operation unit 46, or may be transmitted from an external device to the control unit 20 via the communication unit 42. When the training data 100 is inputted to the control unit 20 of the computer 10, the training data reception means 22 receives the training data 100. Then, the model generation means 24 performs machine learning using the training data 100, to generate the estimation model 110 (second estimation model) for estimating the three-dimensional coordinates of the center of the ball 200 from the coordinates of the four corners of the rectangle 210 enclosing the ball 200 acquired from a still image of the ball 200 and the angle of view or the focal length of the camera 52 having captured the ball 200.

Next, operation when the ball 200 is captured by the camera 52 of the mobile communication terminal 50 will be described. As described above, in the present embodiment, in capturing the ball 200 by the camera 52 of the mobile communication terminal 50, the zoom magnification or the focus position of the camera 52 may be adjusted, whereby the moving images or the still image 120 of the captured ball 200 can be made clear. When the zoom magnification of the camera 52 is adjusted, the angle of view or the focal length of the camera 52 also changes. Further, as shown in FIG. 6, the screen displayed on the monitor 53 also changes when the zoom magnification of the camera 52 is adjusted.

When the moving images of the ball 200 are captured by the camera 52, the still image 120 at each frame of the ball 200 is acquired from the captured moving images of the ball 200. The still image 120 at each frame of the ball 200 is transmitted from the mobile communication terminal 50 to the computer 10, and then received by the reception means 26. Further, information on the angle of view or the focal length of the camera 52 is transmitted from the mobile communication terminal 50 to the computer 10, and then received by the reception means 26 (step S1 in FIG. 3). The angle of view or the focal length of the camera 52 may be directly inputted to the computer 10 by a worker via the operation unit 46, instead of being transmitted from the mobile communication terminal 50 to the computer 10.

Figure 3:
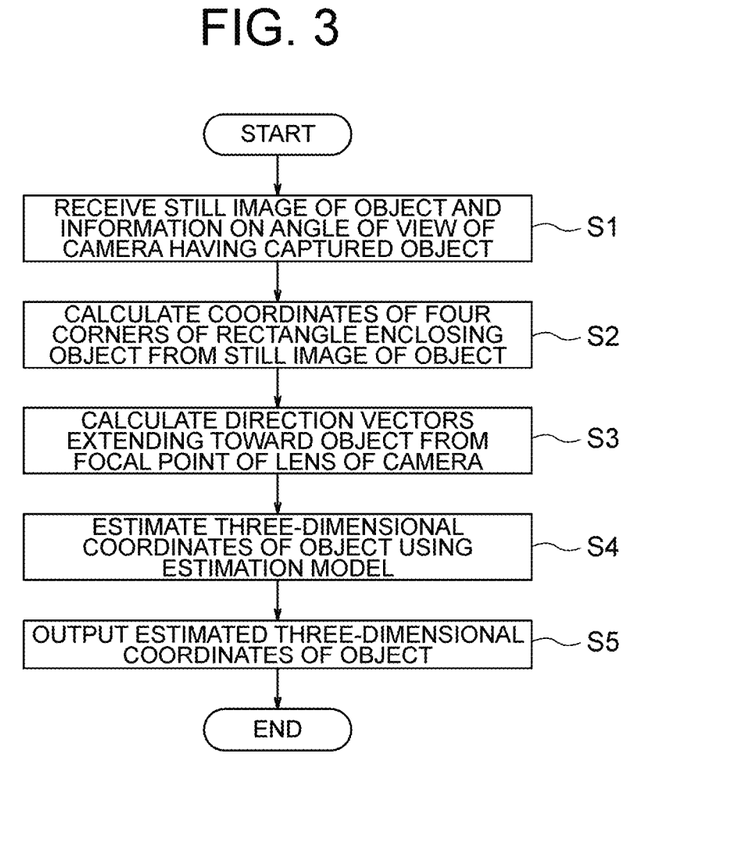
FIG. 3 is a flowchart schematically showing a flow of an information process by the computer shown in FIG. 1.

Next, the calculation means 28 calculates the coordinates of the four corners of the rectangle 210 enclosing the ball 200 from the still image 120 of the ball 200 (step S2 in FIG. 3). Thus, information on the four coordinate sets (x1, y1), (x1, y2), (x2, y1), (x2, y2) as shown in FIG. 4 is acquired. Further, the calculation means 28 calculates direction vectors extending from the focal point of the lens of the camera 52 toward the ball 200, from the coordinates of the four corners of the rectangle 210 enclosing the ball 200 and the angle of view or the focal length of the camera 52 (step S3 in FIG. 3).

Next, the estimation means 30 estimates the three-dimensional coordinates of the center of the ball 200, based on the coordinates of the four corners of the rectangle 210 calculated by the calculation means 28 and the angle of view or the focal length of the camera 52, or based on the direction vectors calculated by the calculation means 28 (step S4 in FIG. 3). Then, the output means 32 outputs the estimated three-dimensional coordinates of the center of the ball 200 (step S5 in FIG. 3). Specifically, the three-dimensional coordinates of the center of the ball 200 obtained from the still images 120 at frames of the ball 200 are connected, whereby information on a three-dimensional trajectory of the ball 200 is outputted. The information outputted from the output means 32 is displayed on the display unit 44, or transmitted to an external device by the communication unit 42 and then displayed on a monitor (e.g., monitor 53 of mobile communication terminal 50) of the external device.

According to the computer 10, the program, and the information processing method of the present embodiment configured as described above, the computer 10 includes: the reception unit 26a which receives a still image of the ball 200 (spherical object) captured by the camera 52 and information on the angle of view or the focal length of the camera 52 having captured the ball 200, which are transmitted from the terminal (mobile communication terminal 50) including the camera 52; the calculation unit 28a which calculates the coordinates of the four corners of the rectangle 210 enclosing the ball 200 from the still image of the ball 200 received by the reception unit 26a, and calculates direction vectors extending from the focal point of the lens of the camera 52 toward the ball 200, from the calculated coordinates of the four corners of the rectangle 210 enclosing the ball 200 and the angle of view or the focal length of the camera 52; the estimation unit 30a which estimates the three-dimensional coordinates of the center of the ball 200, based on the coordinates of the four corners of the rectangle 210 calculated by the calculation unit 28a and the angle of view or the focal length of the camera 52, or based on the direction vectors calculated by the calculation unit 28a; and the output unit 32a which outputs the three-dimensional coordinates of the center of the ball 200 estimated by the estimation unit 30a. According to the computer 10, the program, and the information processing method as described above, even if the focus of the camera 52 is changed, information on the angle of view or the focal length of the camera 52 corresponding to the adjusted focus of the camera 52 is transmitted from the mobile communication terminal 50 to the computer 10, and in the computer 10, the three-dimensional coordinates of the center of the ball 200 is estimated based on the angle of view or the focal length of the camera 52 or based on the direction vectors extending toward the ball 200 from the focal point of the lens of the camera 52. Thus, it is possible to accurately estimate the three-dimensional coordinates of the center of the ball 200 without using a dedicated position-fixed camera. More specifically, in a conventional system, a dedicated camera for capturing a ball is used, and with the position of the camera fixed, the ball 200 is captured in a state in which the zoom magnification and the focus position of the camera are fixed. However, in the conventional system, a dedicated position-fixed camera is needed, resulting in high introduction cost. Meanwhile, if the zoom magnification or the focus position of the camera can be changed between one movement of the ball and another, convenience can be enhanced. In this regard, in the present embodiment, the camera 52 provided to the mobile communication terminal 50 such as a smartphone can be used, and the zoom magnification, the focus position, the resolution, and the like of the camera 52 can be adjusted. Thus, it is possible to solve the above problem of the conventional system.

The estimation unit 30a estimates the three-dimensional coordinates of the center of the ball 200, based on the direction vectors calculated by the calculation unit 28a, using the estimation model 110 (first estimation model) obtained through machine learning using the training data 100 including the direction vectors extending toward the ball 200 from the focal point of the lens of the camera 52 having captured the ball 200 and the three-dimensional coordinates of the center of the ball 200. In this case, using the training data 100 including the direction vectors extending toward the ball 200 from the focal point of the lens of the camera 52 having captured the ball 200 and the three-dimensional coordinates of the center of the ball 200, the model generation unit 24a generates, through machine learning, the estimation model 110 (first estimation model) for estimating the three-dimensional coordinates of the center of the ball 200 from the direction vectors extending toward the ball 200 from the focal point of the lens of the camera 52. Thus, it is possible to more accurately estimate the three-dimensional coordinates of the center of the ball 200, using the estimation model 110 (first estimation model) obtained through machine learning.

The estimation unit 30a may estimate the three-dimensional coordinates of the center of the ball 200, based on the coordinates of the four corners of the rectangle 210 calculated by the calculation unit 28a and the angle of view or the focal length of the camera 52, using the estimation model 110 (second estimation model) obtained through machine learning using the training data 100 including the coordinates of the four corners of the rectangle 210 enclosing the ball 200 acquired from the still image 120 of the ball 200, the angle of view or the focal length of the camera 52 having captured the ball 200, and the three-dimensional coordinates of the center of the ball 200. In this case, using the training data 100 including the coordinates of the four corners of the rectangle 210 enclosing the ball 200 acquired from the still image 120 of the ball 200, the angle of view or the focal length of the camera 52 having captured the ball 200, and the three-dimensional coordinates of the center of the ball 200, the model generation unit 24a generates, through machine learning, the estimation model 110 (second estimation model) for estimating the three-dimensional coordinates of the center of the ball 200 from the coordinates of the four corners of the rectangle 210 enclosing the ball 200 and the angle of view or the focal length of the camera 52 having captured the ball 200. Thus, it is possible to more accurately estimate the three-dimensional coordinates of the center of the ball 200, using the estimation model 110 (second estimation model) obtained through machine learning.

In the computer 10, the program, and the information processing method of the present embodiment, as described above, on the mobile communication terminal 50, the angle of view or the focal length of the camera 52 is allowed to be adjusted before the ball 200 is captured by the camera 52, and when the ball 200 is captured by the camera 52, the still image of the captured ball 200 and information on the adjusted angle of view or focal length of the camera 52 are transmitted from the mobile communication terminal 50 to the computer 10.

In the computer 10, the program, and the information processing method of the present embodiment, as described above, the mobile communication terminal 50 allows the capturing application to be installed thereon, and in a state in which the capturing application is started on the mobile communication terminal 50, when the ball 200 is captured by the camera 52, the still image of the captured ball 200 and information on the angle of view or the focal length of the camera 52 when the ball 200 is captured are transmitted from the mobile communication terminal 50 to the computer 10 by the capturing application.

On the browser displayed on the monitor 53 of the mobile communication terminal 50, information on the angle of view or the focal length of the camera 52 before the ball 200 is captured by the camera 52 may be allowed to be inputted, and when the ball 200 is captured by the camera 52, the still image of the captured ball 200 and information on the angle of view or the focal length of the camera 52 inputted on the browser may be transmitted from the mobile communication terminal 50 to the computer 10.

According to the model generation method of the present embodiment, using the training data 100 including the direction vectors extending toward the ball 200 (spherical object) from the focal point of the lens of the camera 52 having captured the ball 200 and the three-dimensional coordinates of the center of the ball 200, the estimation model 110 (first estimation model) for estimating the three-dimensional coordinates of the center of the ball 200 from the direction vectors extending toward the ball 200 from the focal point of the lens of the camera 52 is generated through machine learning. Thus, it becomes possible to accurately estimate the three-dimensional coordinates of the center of the ball 200 from the still image 120 of the ball 200, using the estimation model 110 generated by the model generation method as described above.

According to another model generation method of the present embodiment, using the training data 100 including the coordinates of the four corners of the rectangle 210 (bounding box) enclosing the ball 200 (spherical object) acquired from the still image 120 of the ball 200, the angle of view or the focal length of the camera 52 having captured the ball 200, and the three-dimensional coordinates of the center of the ball 200, the estimation model 110 (second estimation model) for estimating the three-dimensional coordinates of the center of the ball 200 from the coordinates of the four corners of the rectangle 210 enclosing the ball 200 and the angle of view or the focal length of the camera 52 having captured the ball 200 is generated through machine learning. Thus, it becomes possible to accurately estimate the three-dimensional coordinates of the center of the ball 200 from the still image 120 of the ball 200, using the estimation model 110 generated by the model generation method as described above.

The estimation model 110 (first estimation model) of the present embodiment includes parameters obtained through machine learning using the training data 100 including the direction vectors extending toward the ball 200 from the focal point of the lens of the camera 52 having captured the ball 200 and the three-dimensional coordinates of the center of the ball 200, when the direction vectors extending toward the ball 200 from the focal point of the lens of the camera 52 are set as an input and the three-dimensional coordinates of the center of the ball 200 are set as an output. Thus, it becomes possible to accurately estimate the three-dimensional coordinates of the center of the ball 200 from the still image 120 of the ball 200, using the estimation model 110 as described above.

Another estimation model 110 (second estimation model) of the present embodiment includes parameters obtained through machine learning using the training data 100 including the coordinates of the four corners of the rectangle 210 enclosing the ball 200 acquired from the still image 120 of the ball 200, the angle of view or the focal length of the camera 52 having captured the ball 200, and the three-dimensional coordinates of the center of the ball 200, when the coordinates of the four corners of the rectangle 210 enclosing the ball 200 and the angle of view or the focal length of the camera 52 having captured the ball 200 are set as an input and the three-dimensional coordinates of the center of the ball 200 are set as an output. Thus, it becomes possible to accurately estimate the three-dimensional coordinates of the center of the ball 200 from the still image 120 of the ball 200, using the estimation model 110 as described above.

The computer, the program, the information processing method, the model generation method, the estimation model, and the like according to the present disclosure are not limited to the embodiments described above, and various changes can be made thereto.

For example, the method for calculating the coordinates of the four corners of the rectangle 210 as the bounding box enclosing the ball 200 from the still image 120 of the ball 200 is not limited to the above method. As the method for calculating the coordinates of the four corners of the rectangle 210 as the bounding box enclosing the ball 200 from the still image 120 of the ball 200, various methods other than the above method may be used.

The model generation means 24, the reception means 26, the calculation means 28, the estimation means 30, the output means 32, and the like may be provided to separate computers.

The calculation means 28 calculates the coordinates of the four corners of the rectangle 210 enclosing the ball 200 from the still image of the ball 200 received by the reception means 26. However, the calculation means 28 may not calculate the direction vectors extending toward the ball 200 from the focal point of the lens of the camera 52. As the calculation method for the direction vectors extending toward the ball 200 from the focal point of the lens of the camera 52, a known method other than the above method may be used.

The method for estimating the three-dimensional coordinates of the center of the ball 200 using the estimation model 110 is not limited to the above method. As the method for estimating the three-dimensional coordinates of the center of the ball 200 using the estimation model 110, various methods other than the above method may be used.

Instead of the configuration in which the program according to the present disclosure is stored in the storage unit 40 of the computer 10 and the program stored in the storage unit 40 is executed by the control unit 20, the program according to the present disclosure may be stored in a storage unit of the mobile communication terminal 50 such as a smartphone and the program stored in the storage unit may be executed by a control unit (CPU, etc.) of the mobile communication terminal 50.

The invention claimed is:

1. A computer comprising:
a memory that stores computer program; and
processing circuitry, where the computer program, when executed by the processing circuitry, causes the processing circuitry to
receive a still image of a predetermined-size spherical object captured by a camera and information on an angle of view or a focal length of the camera having captured the object, which are transmitted from a terminal including the camera,
calculate coordinates of four corners of a rectangle enclosing the object from the still image of the object, and calculate direction vectors extending from a focal point of a lens of the camera toward the coordinates of the four corners of the rectangle enclosing the object, from the calculated coordinates of the four corners of the rectangle enclosing the object and the angle of view or the focal length of the camera, estimate three-dimensional coordinates of a center of the object on the ground of the size of the spherical object, based on the direction vectors, and output the three-dimensional coordinates of the center of the object, wherein when the processing circuitry estimates the three-dimensional coordinates of the center of the object, the three-dimensional coordinates of the center of the object are estimated based on the direction vectors, using a first estimation model on the ground of the size of the spherical object obtained through machine learning using training data including the direction vectors extending toward the object from the focal point of the lens of the camera having captured the object and the three-dimensional coordinates of the center of the object.

2. The computer according to claim 1, wherein the processing circuitry is configured to:

generate, through machine learning, the first estimation model for estimating the three-dimensional coordinates of the center of the object from the direction vectors extending toward the object from the focal point of the lens of the camera by using the training data including the direction vectors extending toward the spherical object from the focal point of the lens of the camera having captured the object and the three-dimensional coordinates of the center of the object.

3. The computer according to claim 1, wherein on the terminal, the angle of view or the focal length of the camera is allowed to be adjusted before the object is captured by the camera, and when the object is captured by the camera, the still image of the captured object and information on the adjusted angle of view or focal length of the camera are transmitted from the terminal to the computer.

4. The computer according to claim 1, wherein the terminal allows a capturing application to be installed thereon, and in a state in which the capturing application is started on the terminal, when the object is captured by the camera, the still image of the captured object and information on the angle of view or the focal length of the camera when the object is captured are transmitted from the terminal to the computer by the capturing application.

5. The computer according to claim 1, wherein on a browser displayed on a monitor of the terminal, information on the angle of view or the focal length of the camera is allowed to be inputted before the object is captured by the camera, and when the object is captured by the camera, the still image of the captured object and information on the angle of view or the focal length of the camera inputted on the browser are transmitted from the terminal to the computer.

6. A non-transitory computer readable medium including executable instructions, which when executed by a computer cause the computer to:

receive a still image of a predetermined-size spherical object captured by a camera and information on an angle of view or a focal length of the camera having captured the object, which are transmitted from a terminal including the camera, calculate coordinates of four corners of a rectangle enclosing the object from the still image of the object, and calculate direction vectors extending from a focal point of a lens of the camera toward the coordinates of the four corners of the rectangle enclosing the object, from the calculated coordinates of the four corners of the rectangle enclosing the object and the angle of view or the focal length of the camera, estimate three-dimensional coordinates of a center of the object on the ground of the size of the spherical object, based on the direction vectors, and output the three-dimensional coordinates of the center of the object, wherein when the computer estimates the three-dimensional coordinates of the center of the object, the three-dimensional coordinates of the center of the object are estimated based on the direction vectors, using a first estimation model on the ground of the size of the spherical object obtained through machine learning using training data including the direction vectors extending toward the object from the focal point of the lens of the camera having captured the object and the three-dimensional coordinates of the center of the object.

* * * * *